United States Patent
Dugan et al.

(10) Patent No.: US 9,356,845 B1
(45) Date of Patent: May 31, 2016

(54) SYSTEM AND METHOD FOR AUDIENCE SEGMENT PROFILING AND TARGETING

(75) Inventors: Michael Dugan, New York, NY (US);
David Dunlop, New York, NY (US);
Vadim Supitskiy, New York, NY (US)

(73) Assignee: FORBES MEDIA LLC, Jersey City, NJ (US)

( * ) Notice: Subject to any disclaimer, the term of this patent is extended or adjusted under 35 U.S.C. 154(b) by 599 days.

(21) Appl. No.: 13/041,037

(22) Filed: Mar. 4, 2011

Related U.S. Application Data

(60) Provisional application No. 61/310,747, filed on Mar. 5, 2010.

(51) Int. Cl.
*H04L 12/26* (2006.01)
*H04L 29/08* (2006.01)
*H04L 29/06* (2006.01)

(52) U.S. Cl.
CPC .............. *H04L 43/028* (2013.01); *H04L 67/02* (2013.01); *H04L 63/1408* (2013.01)

(58) Field of Classification Search
CPC .... H04L 67/02; H04L 63/1408; H04L 43/028
USPC ........................................................ 709/224
See application file for complete search history.

(56) References Cited

U.S. PATENT DOCUMENTS

| | | | | |
|---|---|---|---|---|
| 7,143,143 | B1 * | 11/2006 | Thompson | 709/217 |
| 7,600,014 | B2 * | 10/2009 | Russell et al. | 709/224 |
| 7,970,934 | B1 * | 6/2011 | Patel | 709/244 |
| 2002/0035622 | A1 * | 3/2002 | Barber | 709/220 |
| 2002/0099818 | A1 * | 7/2002 | Russell et al. | 709/224 |
| 2007/0250618 | A1 * | 10/2007 | Hammond | 709/224 |
| 2008/0295169 | A1 * | 11/2008 | Crume | 726/22 |
| 2012/0023547 | A1 * | 1/2012 | Maxson et al. | 726/1 |

* cited by examiner

*Primary Examiner* — Philip Chea
*Assistant Examiner* — Robert B McAdams
(74) *Attorney, Agent, or Firm* — Leason Ellis LLP

(57) ABSTRACT

A system and method for audience segment profiling and targeting. The method includes providing a Web server and receiving each of the inbound request messages from one of the Web browsers in the Web server. Selected data contained in each of the inbound request messages is extracted including a UserAgent string and an IP address associated with the inbound request message. A hash ID is generated from the extracted data to uniquely identify each user associated with inbound request messages which is used to augment traditional means for identifying a user such as using a LSO or Cookie when such a LSO or Cookie are not present.

8 Claims, 4 Drawing Sheets

SYSTEM AND METHOD FOR AUDIENCE SEGMENT PROFILING AND TARGETING

CROSS-REFERENCE TO RELATED APPLICATIONS

The present application claims the benefit of U.S. patent application Ser. No. 61/310,747, filed Mar. 5, 2010, which is hereby incorporated by reference in its entirety.

FIELD OF THE INVENTION

This invention relates to data communications systems and, more particularly, to methods and apparatus for storing and utilizing transaction data that includes data derived from the content of Hypertext Transport Protocol requests and responses.

BACKGROUND OF THE INVENTION

The World-Wide Web is based upon the Hyper Text Transfer Protocol ("HTTP"), which allows a user to quickly and easily access any number of servers attached to the Internet and to quickly and easily jump from one location to another. The locations may be on the same information server that a user is currently "visiting" or may be on an information server located half way around the world. This "Web" of information servers represents a vast store of easily accessible information.

For a variety of reasons, it is frequently desirable to record and evaluate the large number of information requests and responses handled by the Web server(s) at a given Web site. For this reason, conventional Web servers normally include a mechanism for compiling a log file which records information on every received HTTP request, including the domain name of the remote host making the request, an identification of the remote user, the date and time of the request, the request line exactly as received, the status code returned to the client, and the length of the response returned. In order to identify the aforesaid remote user, Web servers place identification tags, such as COOKIE and LSO's on the user's computer typically the first time they visit the Web Server. Upon subsequent visits by the user to the Web server, the aforesaid Cookie and/or LSO is sent in the HTTP request which the Web server uses to identify the user to preferably enable value added services (e.g., provide targeted content and/or advertising).

There are several noted disadvantages with using Cookies and/or LSO's for identifying a user. For instance, a user may instruct her web browser not to accept Cookies. A user may intentionally or unintentionally delete Cookies from their computer. Also, since LSO's are used for Flash players, if a user does not use a Flash player, LSO's may be placed within the user's computer. Likewise, a user may refuse to accept LSO's. Further, there is a growing public concern that the use of Cookies and LSO's to identify a user triggers right to privacy issues, thus the use of Cookies and LSO's may be obviated by public or government decree.

SUMMARY OF THE INVENTION

In one aspect, a system and method for audience segment profiling and targeting is described in which an aspect of the invention relates to a computer implemented method for identifying a user from selected content extracted from inbound HTTP request messages sent to a Web server from remotely located Web browsers via the Internet.

The method includes providing a Web server and receiving each of the inbound request messages from one of the Web browsers in the Web server. Selected data contained in each of the inbound request messages is extracted including a User-Agent string and an IP address associated with the inbound request message. A hash ID is generated from the extracted data to uniquely identify each user associated with inbound request messages which is used to augment traditional means for identifying a user such as using a LSO or Cookie when such a LSO or Cookie are not present.

In further, optional aspects, the foregoing method can include the additional step of analyzing the generated hash ID to determine if the user is using a firewall. Also, analyzing the hash ID can further include determining if the user is a "roamer" (uses multiple IP addresses).

BRIEF DESCRIPTION OF THE DRAWINGS

The objects and features of the invention can be understood with reference to the following detailed description of certain embodiments of the invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the invention is shown. The invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting the invention, but rather are provided as a representative embodiment for teaching one skilled in the art one or more ways to implement the invention. Furthermore, the terms and phrases used herein are not intended to be limiting, but rather are to provide an understandable description of the invention.

Figure 1:
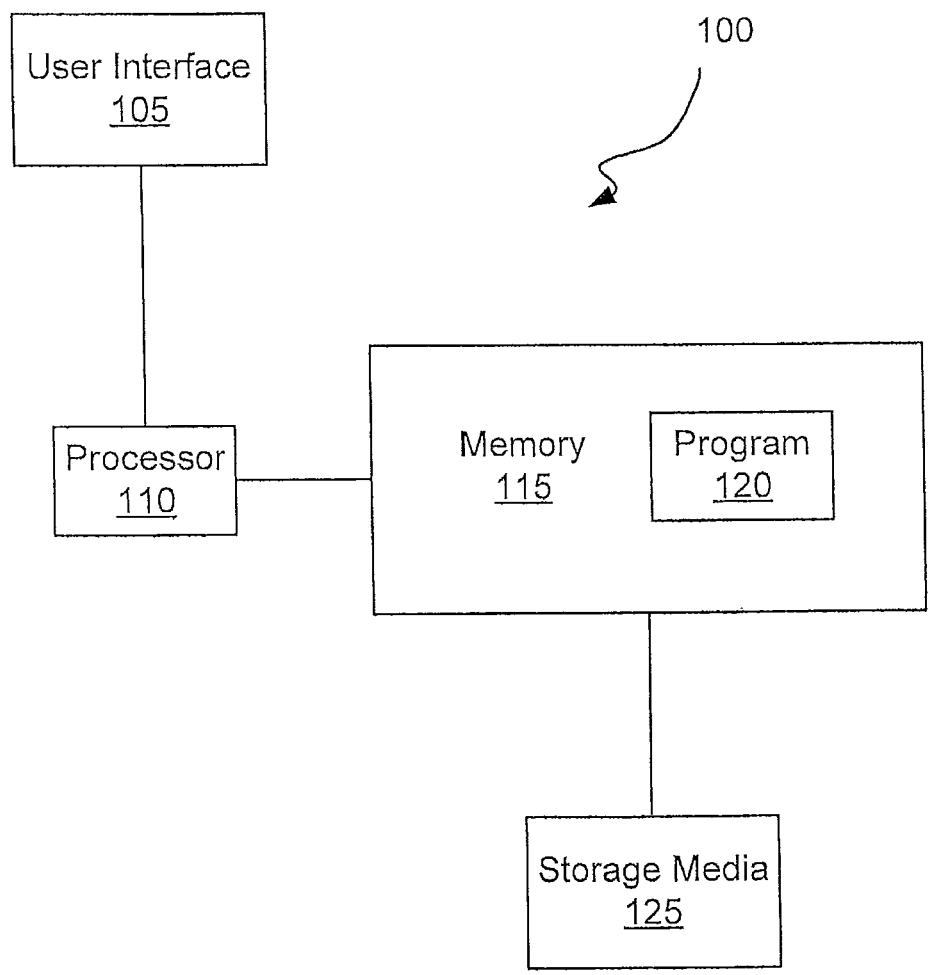
FIG. 1 is a block diagram of a computer system that can be used with certain embodiments of the invention.

It is to be appreciated that the embodiments of this invention as discussed below may be incorporated as a software algorithm, program or code residing in firmware and/or on computer useable medium (including software modules and browser plug-ins) having control logic for enabling execution on a computer system having a computer processor. Such a computer system typically includes memory storage configured to provide output from execution of the computer algorithm or program. An exemplary computer system is shown as a block diagram in FIG. 1 depicting computer system 100. Although system 100 is represented herein as a standalone system, it is not limited to such, but instead can be coupled to other computer systems via a network (not shown) or encompass other embodiments as mentioned below. System 100 preferably includes a user interface 105, a processor 110 (such as a digital data processor), and a memory 115. Memory 115 is a memory for storing data and instructions suitable for controlling the operation of processor 110. An implementation of memory 115 can include a random access memory (RAM), a hard drive and a read only memory (ROM), or any of these components. One of the components stored in memory 115 is a program 120.

Program 120 includes instructions for controlling processor 110. Program 120 may be implemented as a single module or as a plurality of modules that operate in cooperation with one another. Program 120 is contemplated as representing a software embodiment of the process 300 described hereinbelow.

User interface 105 includes an input device, such as a keyboard, touch screen, tablet, or speech recognition subsystem, for enabling a user to communicate information and command selections to processor 110. User interface 105 also includes an output device such as a display or a printer. In the case of a touch screen, the input and output functions are provided by the same structure. A cursor control such as a mouse, track-ball, or joy stick, allows the user to manipulate a cursor on the display for communicating additional information and command selections to processor 110. In embodiments of the present invention, the program 120 can execute entirely without user input or other commands based on programmatic or automated access to a data signal flow through other systems that may or may not require a user interface for other reasons.

While program 120 is indicated as already loaded into memory 115, it may be configured on a storage media 125 for subsequent loading into memory 115. Storage media 125 can be any conventional storage media such as a magnetic tape, an optical storage media, a compact disc, or a floppy disc. Alternatively, storage media 125 can be a random access memory, or other type of electronic storage, located on a remote storage system, such as a server that delivers the program 120 for installation and launch on a user device.

It is to be understood that the invention is not to be limited to such a computer system 100 as depicted in FIG. 1 but rather may be implemented on a general purpose microcomputer incorporating certain components of system 100, such as one of the members of the Sun® Microsystems family of computer systems, one of the members of the IBM® Personal Computer family, one of the members of the Apple® Computer family, or a myriad of other computer processor driven systems, including a: workstations, desktop computers, laptop computers, netbook computers, a personal digital assistant (PDA), or a smart phone or other like handheld devices.

The method described herein has been indicated in connection with a flow diagram (FIG. 3) for facilitating a description of the principal processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

Figure 2:
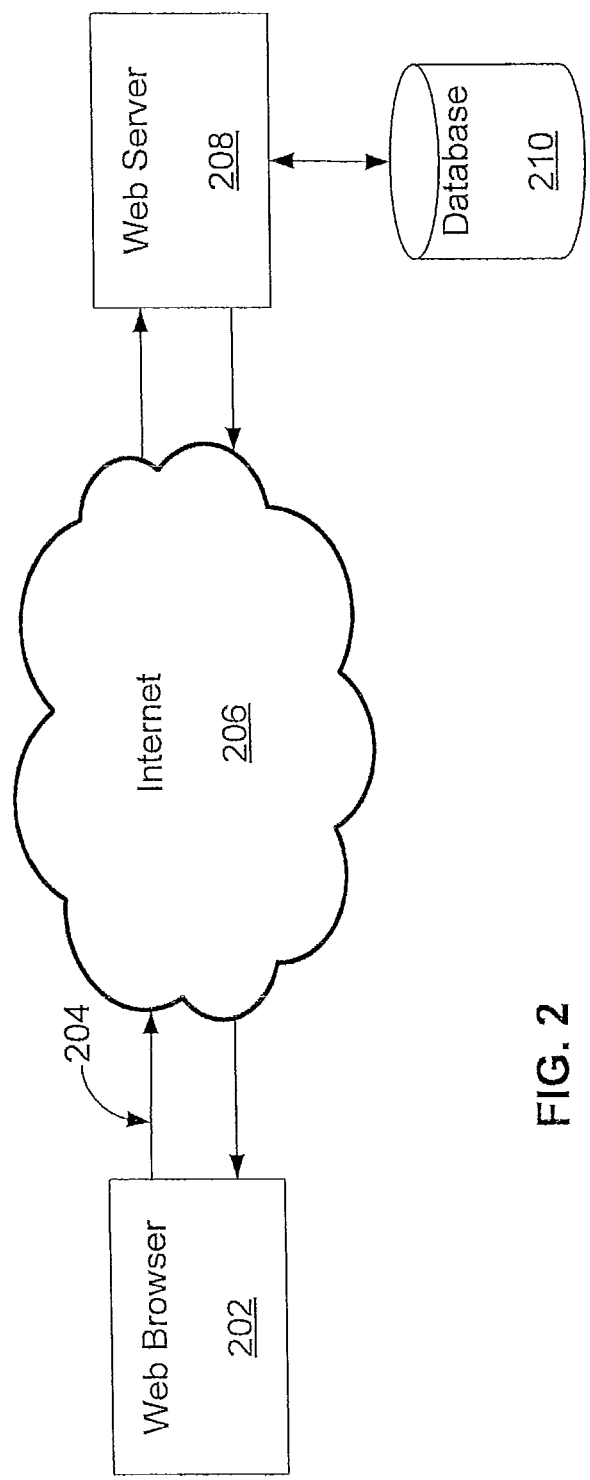
FIG. 2 is a system level diagram of certain embodiments of the invention.

More particularly, illustrated in FIG. 2 is an environment of use for certain embodiments of the invention including Web browsers 202 from which request messages are received, and one or more Web server systems 208 which process those requests and return responses. A "browser" as that term is used here refers to any kind of user agent which sends HTTP request messages to and receives response messages from an HTTP server, and includes browsers, editors, spiders (web-traversing robots), or other end user tools. The term "server" and "Web server" as used herein means an application program that accepts connections in order to service HTTP request messages by sending back response messages. It is also to be understood to be used in conjunction with a Java server and a Hypertext Processor (PHP). The Java server is preferably operable to control the content or appearance of Web pages through the use of servlets which are small programs that are specified in the Web page and run on the Web server to modify the Web page before it is sent to the user who requested it. The PHP server generally creates dynamic web pages.

It is to be appreciated that virtually every device (e.g., Web browser 202) connected to the Internet 206 is assigned a unique number known as an Internet Protocol (IP) address. IP addresses consist of four numbers separated by periods (also called a 'dotted-quad'), an example of which is: 157.12.5.6. Since these numbers are usually assigned to internet service providers within region-based blocks, an IP address can often be used to identify the region and/or country from which a computer is connecting to the Internet as well as other geographic information. An IP address may be used to show the user's general location. Additionally, virtually every web browser 202 includes a "UserAgent" which typically identifies itself, its application type, operating system, software vendor, or software revision, by submitting a characteristic identification string to its operating peer (e.g., Web server system 208). In the HTTP protocols, this is transmitted in a "User-Agent" header field.

With reference to FIG. 2, a generalized message flow for a single request/response exchange will now be briefly discussed. A remotely located Web browser 202 (for example, a Microsoft Internet Explorer executing on a PC connected to the Internet) transmits an inbound HTTP request message 204, via the Internet 206, to the Web server system 208. The Web server system 208 also stores information about the request message, and particularly the user of Web browser 202, in a database 210. It is to be appreciated that database 210 is preferably implemented by a relational database system, the functionality of which will be discussed further below. The Web server system 208 processes the request message and returns a response via the Internet 206 to the Web browser 204, preferably using profile information relating to the user of Web browser 202 as retrieved from database 210, as also discussed further below.

The Web server system 208 processes request and response messages which are received and sent using the Hypertext Transfer Protocol (HTTP), an application-level protocol used by the World-Wide Web global information system. The HTTP protocol is a request/response protocol. A client sends a request to the server in the form of a request method, URI, and protocol version, followed by a MIME-like message containing request modifiers, client information, and possible body content over a connection with a server. The server typically responds with a status line, including the message's protocol version and a success or error code, followed by a MIME-like message containing server information, entity meta-information, and possible entity-body content. HTTP messages consist of requests from client to server and responses from server to client.

Figure 3:
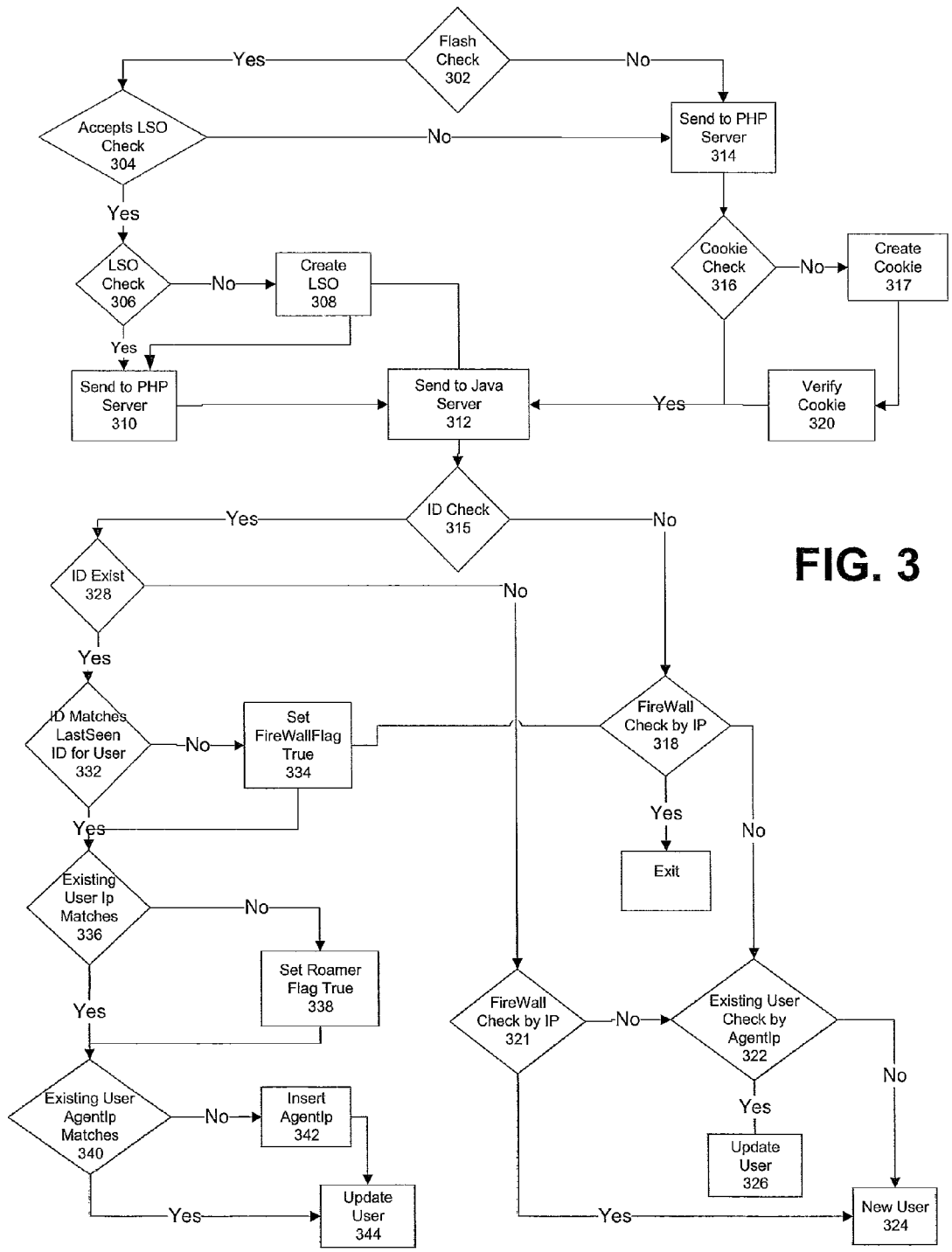
FIG. 3 is a flow diagram of certain embodiments of the invention.

The functions performed by the Web server system 208 for recognizing the user of a Web browser 202 during a request/response exchange are illustrated in the flow diagram of FIG. 3. It is to be understood the Web server system 208 receives an inbound HTTP request message 204 from Web browser 202. Based upon the inbound HTTP request message 204, a determination is made as to whether the Web browser 202 has a Flash media player installed (step 302). A Flash media player is understood to store Local Shared Objects (LSO's). An LSO, also commonly called flash cookies, are collections of cookie-like data stored as a file on a user's computer used by web sites to collect information on how people navigate web sites.

If it is determined a Flash player is installed, a determination is made as to whether the Flash player accepts LSO's (step 304). If yes, a determination is made as to whether an LSO is present which was previously provided by Web server system 208 (step 306). If no, then Web server system 208 creates and places an LSO in the Flash player associated with Web browser 202 so as to identify the user of Web browser 202 next time the user visits Web server 208 (step 308), as further discussed below. If yes (an LSO for Web server system 208 is present in the Flash player of Web browser 202 (step 306)), the inbound HTTP request message 204 is sent to a PHP server (step 310) and then to a Java server (step 312).

Returning to steps 302 and 304, if the requesting Web browser 202 was determined not to have a Flash player (step 302), or the Flash player was determined not to accept LSO's (step 304), then the inbound HTTP request message 204 from Web browser 202 is sent to the aforementioned PHP server (step 314). Afterwards, a determination is made as to whether a Cookie from web server 208 is present in the inbound HTTP request message 204 (step 316). As is known, a Cookie (also known as a: tracking cookie, browser cookie, and HTTP cookie) is a small piece of text stored on a user's computer by a web browser. The Cookie is sent as an HTTP header by a Web server to a Web browser and then sent back unchanged by the browser each time it accesses that server. A Cookie can be used for authentication, session tracking (state maintenance), storing site preferences, shopping cart contents, the identifier for a server-based session, or anything else that can be accomplished through storing textual data. It is to be appreciated most Web browsers allow users to decide whether to accept Cookies, and the time frame to keep them.

If a Cookie was determined not to be present in the inbound HTTP request message 204 (step 316), a Cookie is then caused to be placed in the user's Web browser 202 (step 317) after which the Cookie is then verified (step 320). The inbound HTTP request message 204 is then sent to the aforementioned Java server (step 312).

It is to be appreciated that the aforesaid steps for determining whether an aforesaid LSO or Cookie was present in the inbound HTTP request message 204 are performed in JavaScript and/or ActionScript on the client-side (e.g., the user's Web browser 202). Additionally, it is to be appreciated that when the user's "ID" is generated, (e.g., the LSO or Cookie, as mentioned above), it is preferably generated by a call to the PHP platform.

With continuing reference to FIG. 3, on the server-side (e.g., Web server 208) for the inbound HTTP request message 204, a determination is then made as to whether the inbound HTTP request message 204 contained a user ID (e.g., a LSO or Cookie) (step 315). If there was no user ID, then a "hash ID" is to be used for the inbound HTTP request message 204 preferably consisting of the IP address and UserAgent associated with the inbound HTTP request message 204. A determination is then made as to whether the user (as identified by the aforesaid hash ID) for inbound HTTP request message 204 resides behind a firewall (step 318). This determination is made by determining if an IP address of hash ID is associated with other previously recognized hash ID's which have the same IP address. This is indicative of a firewall because all user's of a firewall are typically assigned a common IP address. If yes, the process ends because the user of the inbound HTTP request message 204 cannot be accurately tracked due to the presence of a firewall and the lack of a user ID (e.g., LSO or Cookie). If there was no determined firewall (step 318), then a determination is made as to whether the user (as identified by its hash ID) of the inbound HTTP request message 204 is an existing user (e.g., previously accessed Web server 208) (step 322). If it is determined the user of the inbound HTTP request message 204 is a new user (the user hash ID was not previously recorded in database 210), then a new profile record for the user is created in the database 210 (step 324), as mentioned further below. And if it is determined the user of the inbound HTTP request message 204 is an existing user, then the user's preexisting profile record is accordingly updated (step 326), as also mentioned further below.

Returning reference now to step 314 in FIG. 3, if it is determined the inbound HTTP request message 204 contained a user ID (e.g., a LSO or Cookie), then a determination is made as to whether the user (as identified by the User ID) of the inbound HTTP request message 204 is an existing user (e.g., previously accessed Web server 208) (step 328). If the aforesaid User ID is not recognized, this could be indicative that the user is either new or recently cleared their LSO's and/or Cookies, or is using a new web browser or changed their privacy settings to now allow LSO's and/or Cookies. Regardless of the reason, if the User ID is not recognized (step 328), a determination is made as to whether the user uses a firewall (step 330). This is accomplished by determining if the IP address of the inbound HTTP request message 204 was associated with other previously received inbound HTTP request messages having a common IP address but different hash ID. If yes, the IP address was previously recognized, this is indicative the user of the inbound HTTP request message 204 is a new user who uses a firewall. A new profile record for the user is then created in the profile database 210 (step 324), as mentioned further below. If no, the IP address was not previously recognized with the user's inbound HTTP request message 204 (step 321), then a determination is made as to whether the user (as identified by it's hash ID) is an existing user who previously accessed Web server 208 (step 322) (e.g., has the user's hash ID been previously recognized). If it is determined the user of the inbound HTTP request message 204 is a new user (e.g., first time accessing Web server 208), then a new profile record for the user is created in the profile database 210 (step 324), as mentioned further below. And if it is determined the user of the inbound HTTP request message 204 is an existing user (e.g., previously accessed Web server 208), then user's preexisting profile record is accordingly updated (step 326), as also mentioned further below.

Returning reference now to step 328 in FIG. 3, if the aforesaid User ID is recognized as having previously accessed Web server 208, a determination is made as to whether the IP address of User ID has been previously recognized with other User ID's (step 332). If yes, that is the IP address has been used in conjunction with different User ID's, this is indicative that the User uses a firewall and the User ID is flagged as a firewall user (step 334).

Next, a determination is made as to whether the User ID for the inbound HTTP request message 204 has been used in conjunction with other IP addresses (step 336). In other words, has different IP addresses been used in conjunction with the User ID, which is indicative that the User is a "roamer" (e.g., the user uses a laptop from multiple locations, such an office, home or travel location each having a unique IP address). If yes, the User ID is flagged as a "roamer" (step 338).

Next, a determination is made as to whether the hash ID associated with the inbound HTTP request message 204 has been previously associated with the aforesaid User ID (step 340). If no, then this is indicative that the user has changed or upgraded their web browser since their UserAgent has changed and the user's hash ID is then tagged to reflect this web browser change (step 342) which is then recorded in it's profile record in database 210 (step 344). If yes, (the user's hash ID matches it's previously used hash ID) then the user's activity via the inbound HTTP request message 204 is recorded in it's profile record in database 210 (step 344).

Figure 4:
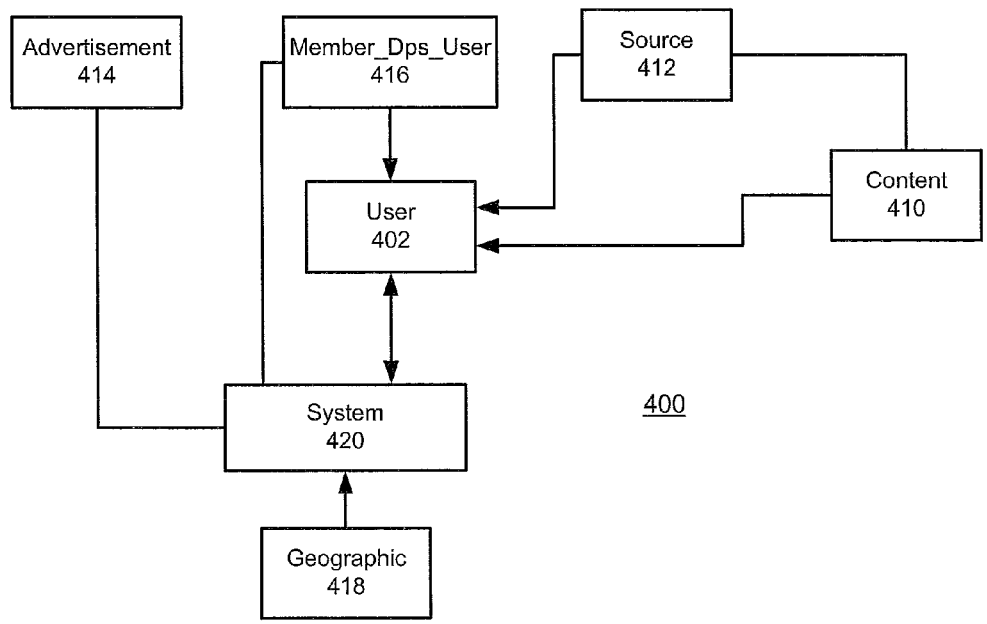
FIG. 4 illustrates a user profile stored in the database of FIG. 2.

With reference now to FIG. 4, the aforesaid process 300 for recognizing a user 402 of an inbound HTTP request message 204 is used to create (e.g., a new user) or update (e.g., an existing user) a profile record 400 for the user 402 in database 210. As mentioned above, information to be recorded in the user's profile record in database 210 includes whether the user is a new user (step 324), an existing user (steps 326 or 344), uses a firewall (steps 318, 330 or 334), is a roamer (338), and has changed their web browser (step 342). Additionally, as depicted in FIG. 4, each user's profile record 400 in database 210 will preferably include content metadata fields 410, referring data sources 412, 414 and 416, user geographic data 418 and system identification information 420 relating to the user 402. This information is preferably obtained from analysis of the user's inbound HTTP request message 204.

It is to be appreciated that an advantage of the certain illustrated embodiments of the invention is the aforesaid collected data in each user's profile record created in database 210 aggregates raw traffic logs into a normalized database enabling reporting user trends and for providing user segmentation that classifies user's into sales groups and interest categories, geographic sectors and loyalty tiers. These classifications are then developed as business rules and made available for ad targeting and content personalization.

Figure 5:
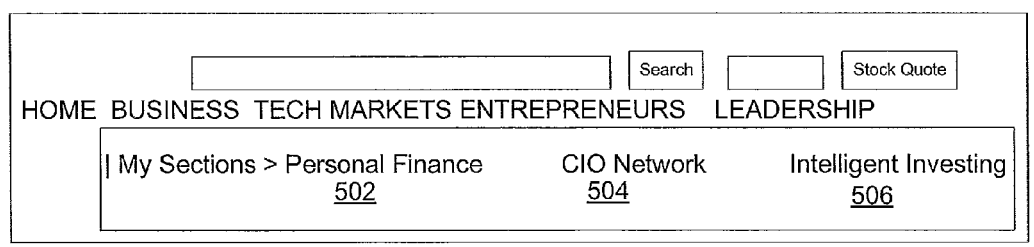
FIG. 5 depicts a web page having personalized content created using stored user profile information.

For instance, with reference to FIG. 5, the aforesaid user data collected in database 210 can be used to provide a customized floating personal navigator toolbar 500 indicating areas 502-506 that are determined to be most frequently visited by a user. It can also indicate areas that the user will likely visit based on the user's recorded viewing profile as set forth in database 210.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the scope of the present invention.

What is claimed is:

1. A computer implemented method for identifying a user from content extracted from a plurality of inbound HTTP request messages sent to a Web server from a plurality of remotely located Web browsers via the Internet, the method consisting of:

providing a Web server, the Web server including a memory, a processor in communication therewith, wherein the processor is configured by the instructions executing therein;

receiving a first plurality of the inbound request messages from a first of said Web browsers by the configured processor of said Web server;

extracting, by the configured processor, data contained in each of said plurality of inbound request messages including a UserAgent and IP address associated with each of said plurality of inbound request messages, wherein the UserAgent identifies the first particular Web browser transmitting the plurality of inbound HTTP request messages;

generating, by the configured processor, a hash from said extracted data to uniquely identify each user associated with said plurality of inbound request messages; and determining whether the IP address associated with the first plurality of inbound messages having one of the hashes was associated with other previously extracted inbound HTTP request messages having a different hash, whereby the user is identified from one of the hashes generated from the extracted data whether the IP address associated with the first plurality of inbound messages was associated with other inbound HTTP request messages having a different hash.

2. A method as recited in claim 1, further including the steps of:

providing a database coupled to said web server; and storing, by the configured processor, said generated hash in said database with other data extracted from said inbound request messages and augmenting said generated hash to provide profile information associated with each said generated hash, wherein said generated hash is stored in association with a previously generated hash if said generated hash and the previously generated hash match.

3. A method as recited in claim 2 wherein the step of extracting data includes extracting a Cookie from said inbound request messages to augment said generated hash to uniquely identify each user associated with said inbound request messages.

4. A method as recited in claim 2 wherein the step of extracting data includes extracting a Flash Local Stored Object (LSO) from said inbound request messages to augment said generated hash to uniquely identify a user associated with said inbound request messages.

5. A method as recited in claim 2 further including the step of analyzing said generated hash to determine if said user is using a firewall having a static Internet Protocol (IP) address.

6. A method as recited in claim 2 further including the step of analyzing said generated hash to determine if said user is using multiple Internet Protocol (IP) addresses to connect to the Internet.

7. A system for extracting selected content in a plurality of HTTP request messages from a plurality of remotely located Web browsers presented to a Web server having a processor and a memory, consisting of:

an Internet connection for receiving the plurality of HTTP request messages in the Web server;

instructions are stored in the memory and executing in the processor of the Web server operative to:

extract data contained in each of the plurality of HTP request messages including a UserAgent and an IP address for the first plurality of HTTP request messages, wherein the UserAgent identifies a first particular Web browser transmitting a first plurality of the HTTP request messages;

generate a hash from the extracted data to uniquely identify each user associated with said inbound request messages; and determine whether the IP address associated with the first plurality of inbound messages have one of the hashes was associated with other previously extracted inbound HTTP request messages having a different hash, whereby the user is identified from one of the hashes generated from the extracted data whether the IP address associated with the first plurality of inbound messages was associated with other inbound HTTP request messages having a different hash.

8. A method as recited in claim 1, further including the steps:
    determining if said generated hash matches a previously generated hash stored in a database in association with a user profile record, and if not, generating the user profile record;
    storing, by the configured processor, said generated hash in said database with other data extracted from said inbound request messages augmenting said generated hash to provide profile information associated with said generated hash, wherein said generated hash is stored in association with the user profile record.

* * * * *